United States Patent [19]

Seeger et al.

[11] 4,350,484

[45] Sep. 21, 1982

[54] FORMING LINE FOR USE IN THE MANUFACTURE OF PARTICLE BOARDS

[75] Inventors: Günter Seeger, Springe; Dieter Wiemann, Barsinghausen, both of Fed. Rep. of Germany

[73] Assignee: Bison-Werke Bähre und Greten GmbH & Co. KG, Fed. Rep. of Germany

[21] Appl. No.: 148,688

[22] Filed: May 12, 1980

[30] Foreign Application Priority Data

May 18, 1979 [DE] Fed. Rep. of Germany ....... 2920219
May 18, 1979 [DE] Fed. Rep. of Germany ....... 2920220
May 18, 1979 [DE] Fed. Rep. of Germany ....... 2920221

[51] Int. Cl.³ ............................................... B29J 5/08

[52] U.S. Cl. ................................... 425/140; 425/338; 425/341

[58] Field of Search ........................ 425/140, 338, 341

[56] References Cited

U.S. PATENT DOCUMENTS 4,038,531 7/1977 Loe, Jr. .............................. 425/140
4,222,724 9/1980 Hullen ................................ 425/141

*Primary Examiner*—James R. Hall

[57] ABSTRACT

Particle boards are manufactured by the use of a forming line in which particulate material such as wood chips intermixed with a binder is deposited, in the form of a mat, by a scattering station 3 onto mat carriers moving on a forming conveyor 1 past the scattering station. The mat carriers are loaded by way of an accelerating conveyor 4 onto a faster moving storage conveyor 5 and are then stacked in the tiers of a vertically movable stacker loader 13 which in turn feeds a consolidation press for consolidating the mat sections into particle board. After the pressing operation the particle boards are ejected from the far side of the press and the now empty mat carriers are returned via the stacker-loader and a return conveyor 8 to a forwarding station 2 which feeds the mat carriers back onto the forming conveyor 1 for re-use.

In a particularly preferred arrangement a pallet is provided in respect of each tier of the stacker-loader and the mat carriers are loaded onto the upper surface of the pallet and thereby introduced into the press. The pallet serves to eject the finished board from the far side of the press and to return the empty mat carrier which is slung beneath the pallet.

30 Claims, 13 Drawing Figures

FORMING LINE FOR USE IN THE MANUFACTURE OF PARTICLE BOARDS

Figure 1:
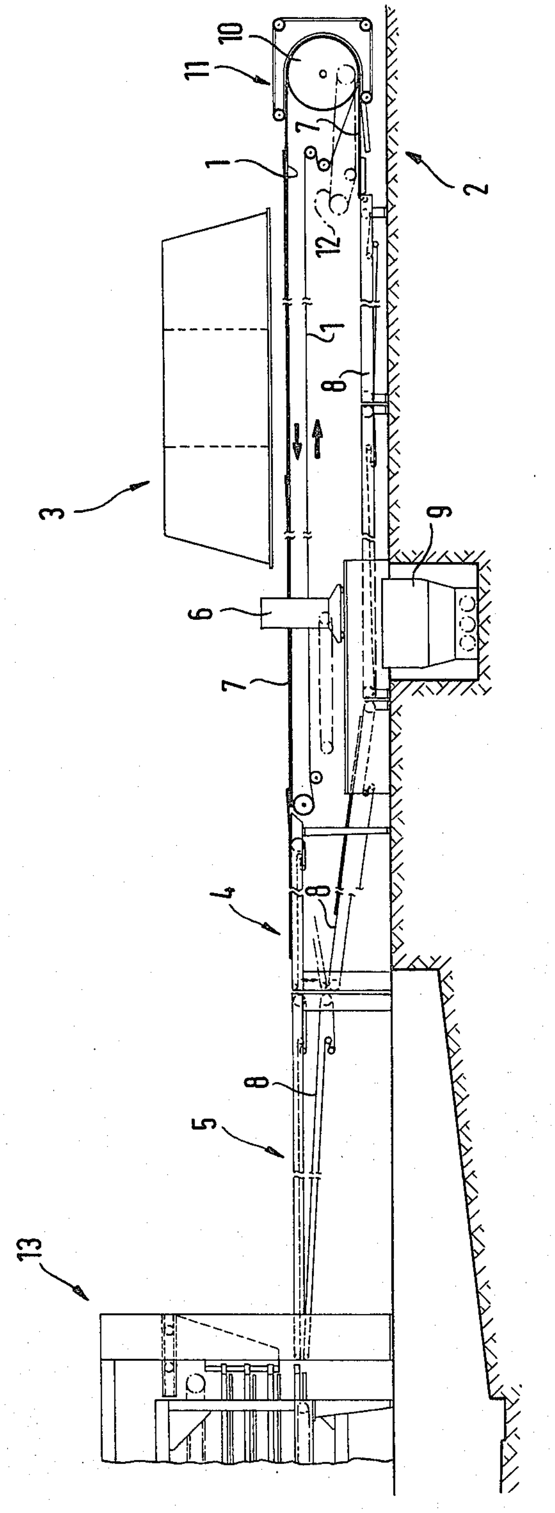

The invention relates to a forming line for use in the manufacture of particles boards and has particular reference to an installation in which particulate material is deposited in the form of a mat onto mat carriers and the latter are loaded into and unloaded from a consolidating press which may be of the single or multistorey type. Such presses are usually used to consolidate mat sections by the application of pressure and heat to the finished particle boards.

The particulate material conventionally chosen for the manufacuture of particle boards generally consists of particles containing cellulose and/or lignocellulose together with at least one binder medium dispersed in the particles. It is particularly common to use wood chips and/or plant fibres as the particulate material.

In a conventional installation the particulate material may be scattered at a scattering station into a mat which found on a series of mat carriers moving along a series of conveyors. A separating device is used to remove strips of mat material to leave individual mat sections on individual mat carriers. These separating devices are frequently referred to as mat separating saws although they do not normally cut but rather suck or blow away mat material to achieve the desired mat sections. The removed material is then fed back to the scattering station, which conveniently takes the form of a wind sifting device, where it is re-used. The mat carriers which are loaded with the mat sections are then passed to a transport conveyor and transferred into a so-called stacker-loader. The stacker-loader is normally a multi-tier vertically displaceable structure adapted to be moved to a series of vertical positions and to receive a loaded mat carrier on each tier. When the stacker-loader is full the loaded mat carriers are transferred to a press, usually of the multistorey type, having one storey corresponding to each tier of the stacker-loader. After consolidation of the mat sections on the mat carriers the consolidated particle boards are ejected from the machine and the mat carriers are returned to a forwarding station where they are once more fed onto the conveyor which runs through the scattering station.

Known forming lines of this kind have however a rather complicated overall construction and require a large amount of space particularly for the return of the mat carriers and renewed forwarding of the same onto the forming conveyor. Moreover, in known installations of this kind a large number of mat carriers are in circulation and the accompanying drives, gear mechanisms and clutches make the installations complex, expensive and susceptible to break down.

A prime object of the invention is to so arrange a forming line of the kind generally set out above that it takes up a relatively small amount of space and has a particularly high output, despite the use of only a relatively small number of mat carriers, so that automatic operation is possible in a manner less susceptible to break down.

A further object of the invention is to make it possible to use desired, and in particular very thin, mat carriers and to ensure a significant saving of time during loading and un-loading of both the loader-stacker and the associated consolidating press.

A further object of the invention is to increase the flexibility of the forming line to manufacture different board sizes and types and to make it possible to vary the width of overlap between successive mat carriers in accordance with the different requirements of various board sizes.

In accordance with a basic form of the invention there is provided a forming line having the characteristics set out in the accompanying main claim to which reference is now specifically made.

The forwarding station conveniently includes a device for setting and preferably selectively varying the relative positions of successive mat carriers on the forming conveyor. This basic construction is particularly compact and has very short transport routes for the mat sections and the mat carriers because the mat carriers are fed into and removed from the same side of the stacker-loader rather than being ejected from the far side of the associated press and having to follow a rather long and tortuous path back to the forwarding station. Thus a more favourable form of transport is achieved for large area mat sections which requires comparatively fewer mat carriers in circulation and which achieves a high efficiency by virture of the temporal cooperation of the various elements of the forming line and the ability to carry out several of the various operations in parallel.

The forwarding station preferably comprises a drum of relatively large diameter, around which the forming conveyor is guided, and a counter pressure device facing said forming conveyor over a part of the drum periphery, with said counter pressure device and said forming conveyor cooperating to deflect unloaded mat carriers, arriving on a return conveyor from the second transport device, around the drum onto the upper run of the forming conveyor. The forwarding station also usefully includes an arrangement for adjusting the degree of overlap of sequential mat carriers on the forming band.

By using the guide drum required for the forming conveyor for loading the forming conveyor with exactly positioned mat carriers, an arrangement is achieved which is particularly economical of space and is thus favoured on cost grounds. Furthermore the required, defined, relative position between sequential mat carriers can be adjusted by means of a transport timing device which is arranged beneath the forming conveyor and in front of the drum so that it once more requires no additional space. It is particularly favourable that the use of the drum for guiding the mat carriers results in the mat carriers being turned over so that, in a continuous process, the top sides and the undersides of the mat carriers are alternatingly used as support surfaces for the mat sections.

A particularly advantageous special feature of the invention resides in the fact that the first transport device, which transfers a mat carrier with its associated mat section from the storage conveyor into one tier of the stacker-loader, consists of transport arms which are arranged at both sides of the stacker-loader and which engage with cut-outs in the edge regions of the mat carriers and are movable in a plane of a respective tier of the stacker-loader.

The operation of this embodiment is advantageously supplemented in that the second transport device, which is used to transfer the unloaded mat carriers which are temporarily stored in the stacker-loader to the return conveyor, comprises an advancable and retractable clip arrangement disposed below the level at which mat carriers are loaded into the stacker-loader with the clip arrangement being engagable with recesses provided in end edge regions of the mat carriers.

Because the first and second transport devices can operate practically simultaneously, and because these two devices preferably operate at any one time in respect of the same tier of the stacker-loader, a significant time saving is achieved, when compared with previously known installations, during the loading and unloading of the stacker-loader.

It is particularly advantageous to use, in conjunction with the forming line of the invention, a stacker-loader in which a horizontally movable pallet is associated with each tier of the stacker-loader. In an arrangement of this kind a loaded mat carrier can be deposited together with its mat section, by means of the corresponding transport device, on the pallet and the pallet can then serve to move the loaded mat carrier into the press and, on its return movement, to transport the unloaded mat carrier from the previous press operation back into the corresponding tier of the stacker-loader. This unloaded mat carrier can then be transported back to the forwarding station with the unloading from the stacker-loader taking place at the same time as that tier is reloaded with a further mat carrier and mat section.

The presence of a pallet which is movable horizontally from a tier of the stacker loader into a storey of a press it means is possible to achieve a reliable and efficient handling of the mat sections on the mat carriers, by the use of simply constructed holding devices provided in the press for the mat carriers, without travelling drives, gears or clutches in the stacker-loader tiers and without special transport arms in the press. The overall construction of the apparatus is simultaneously simplified due to the multiple functions of the pallets and this ensures an increase in the operational reliability and an optimum shortening of the time required for the loading and unloading procedures.

Because the mat carriers are continuously guided over the whole of their surfaces it is possible to use thin, and diverse, carrier materials such as sieves or textiles. The use of these thin mat carriers results in a higher press efficiency and shorter cooling times are required by virtue of the low heat content.

Figure 2:
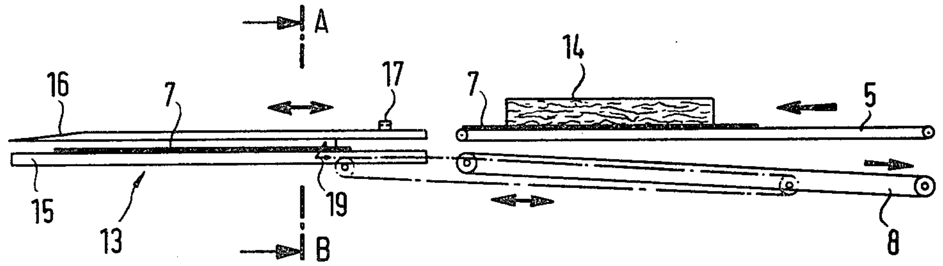
Figure 3:
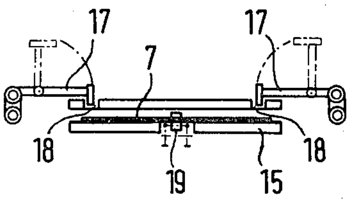
Figure 4:
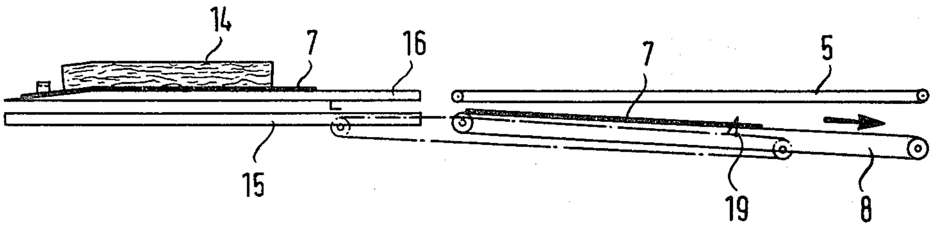
Figure 5:
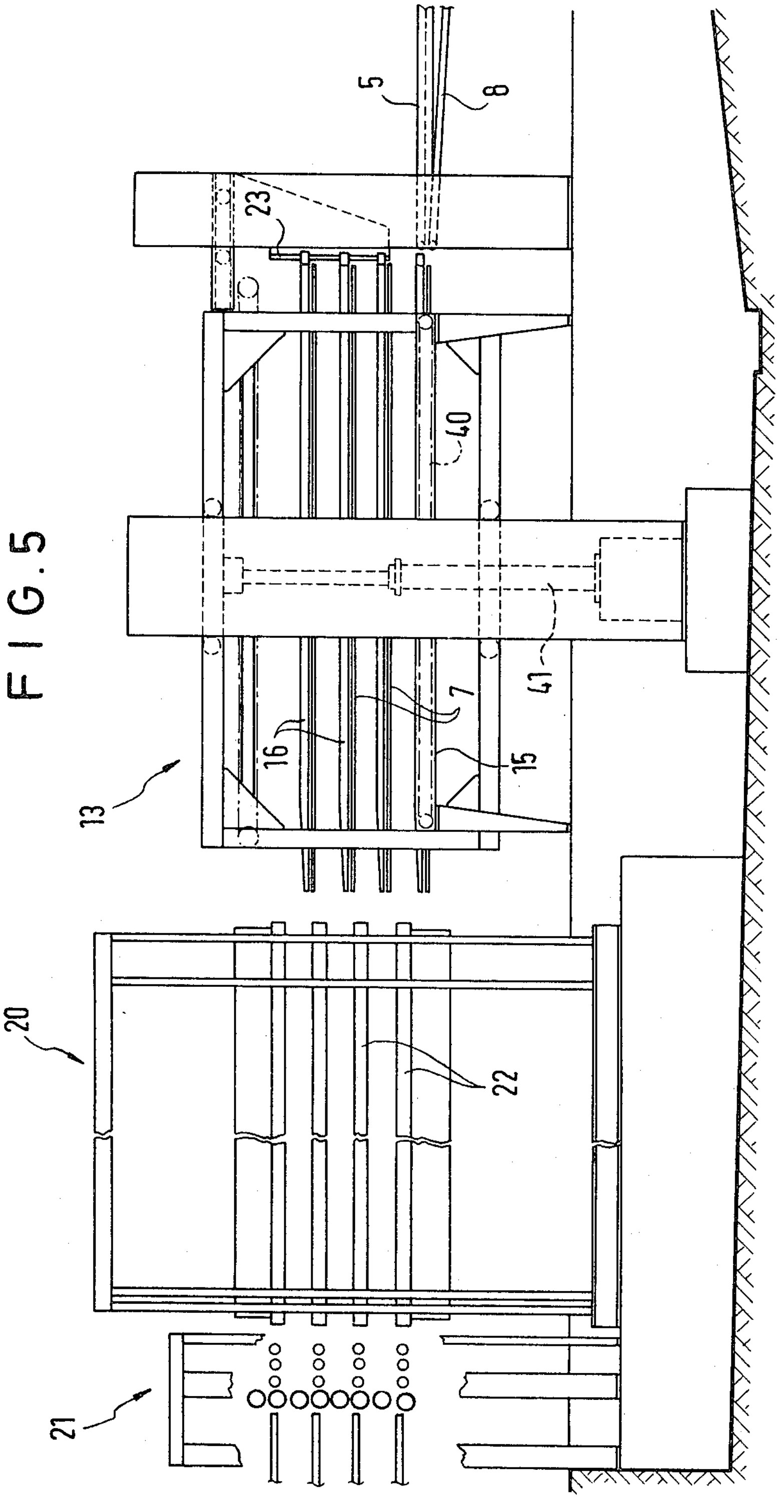
Figures 6A, 6B, 6C:
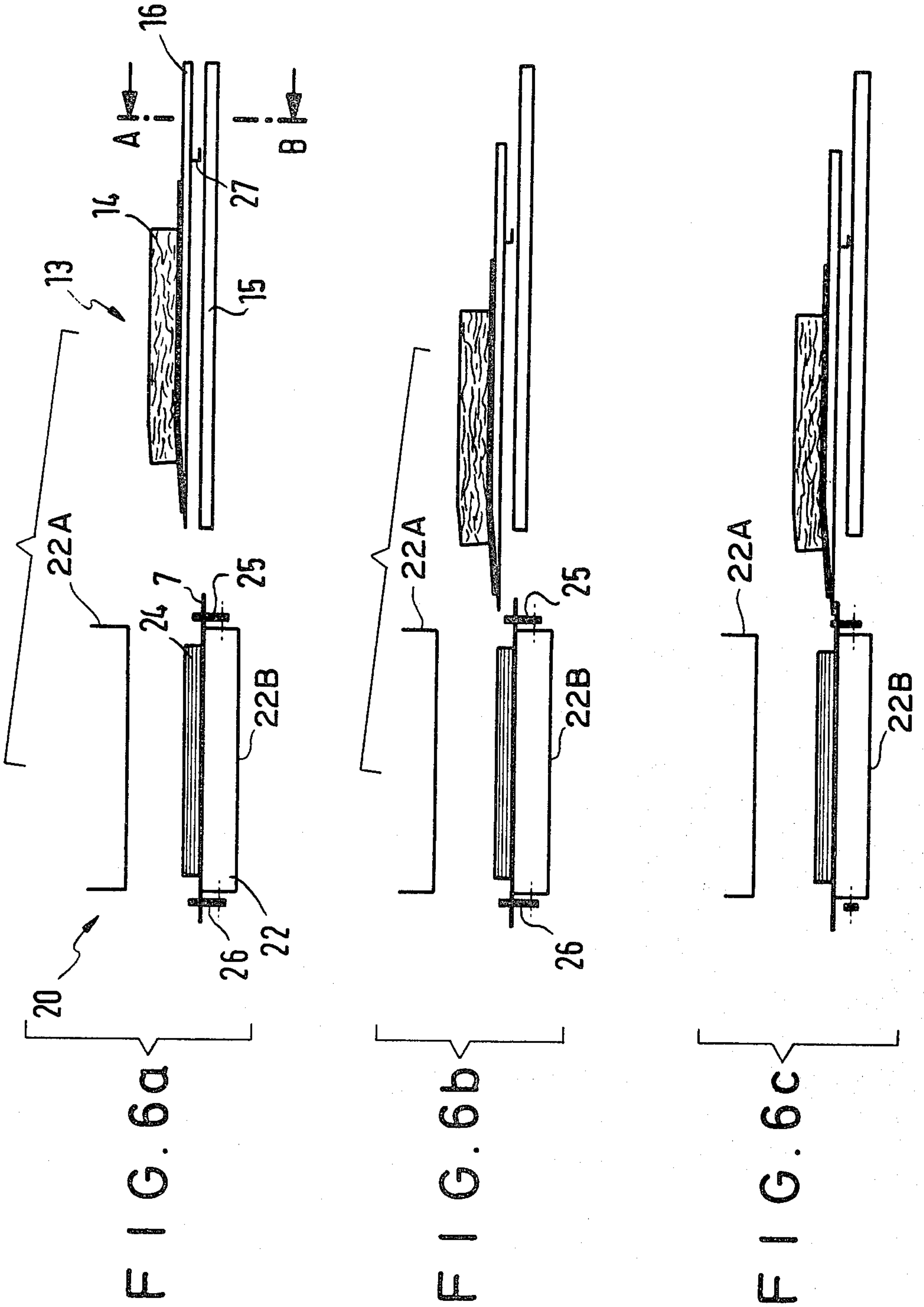
Figures 6D, 6E, 6F, 7:
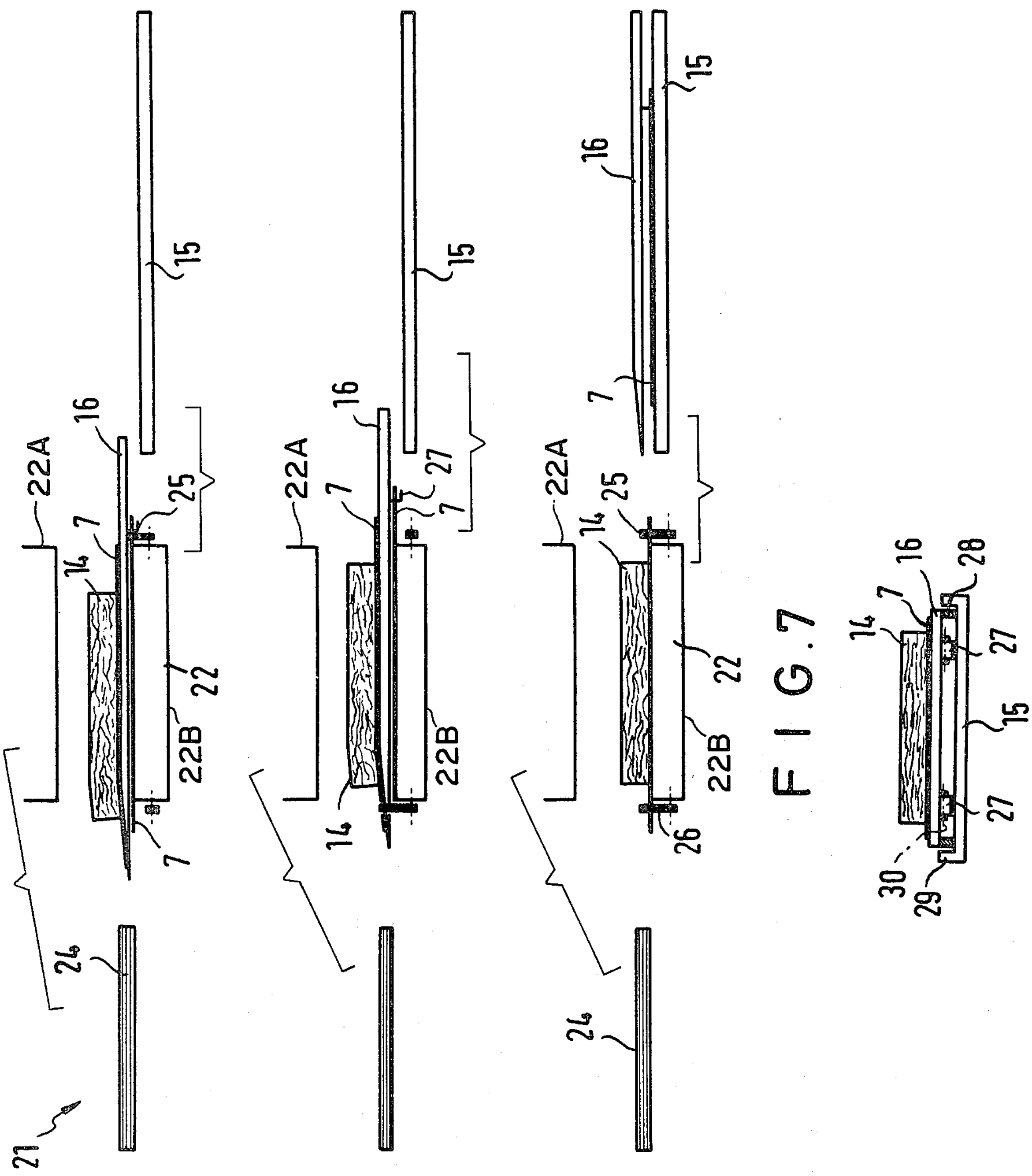
Figure 8:
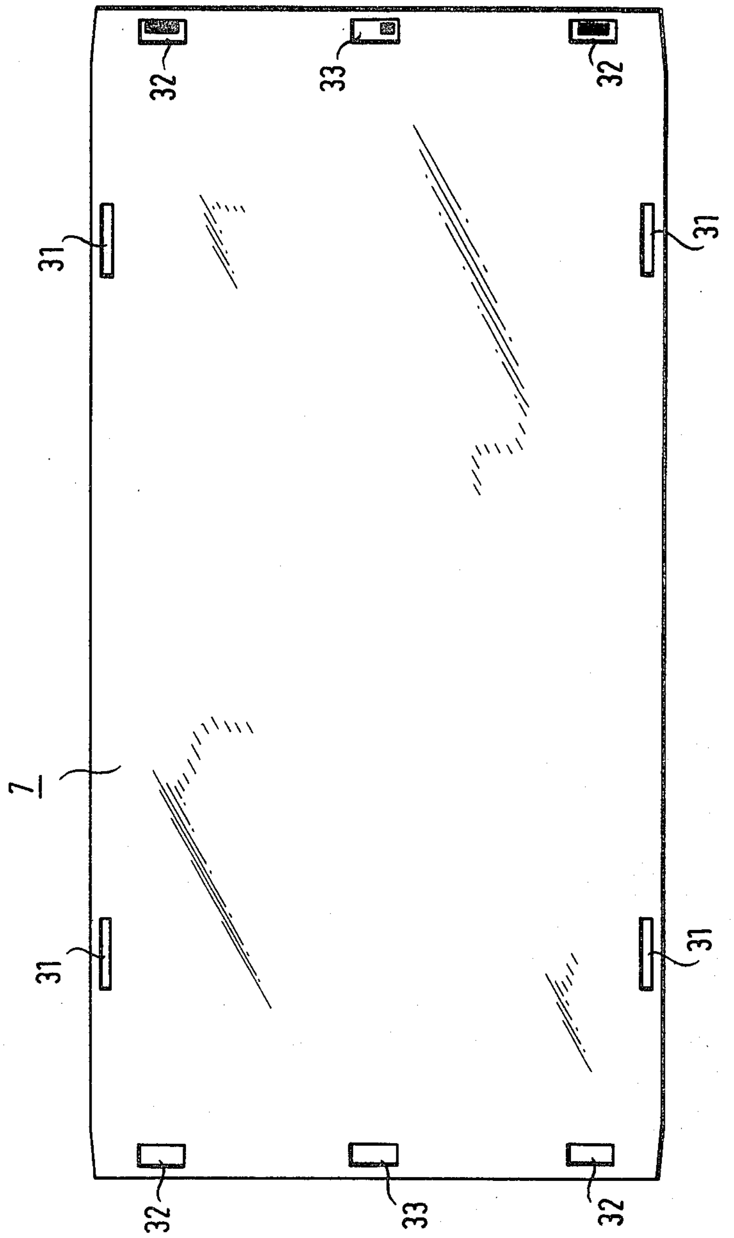
Figure 9:
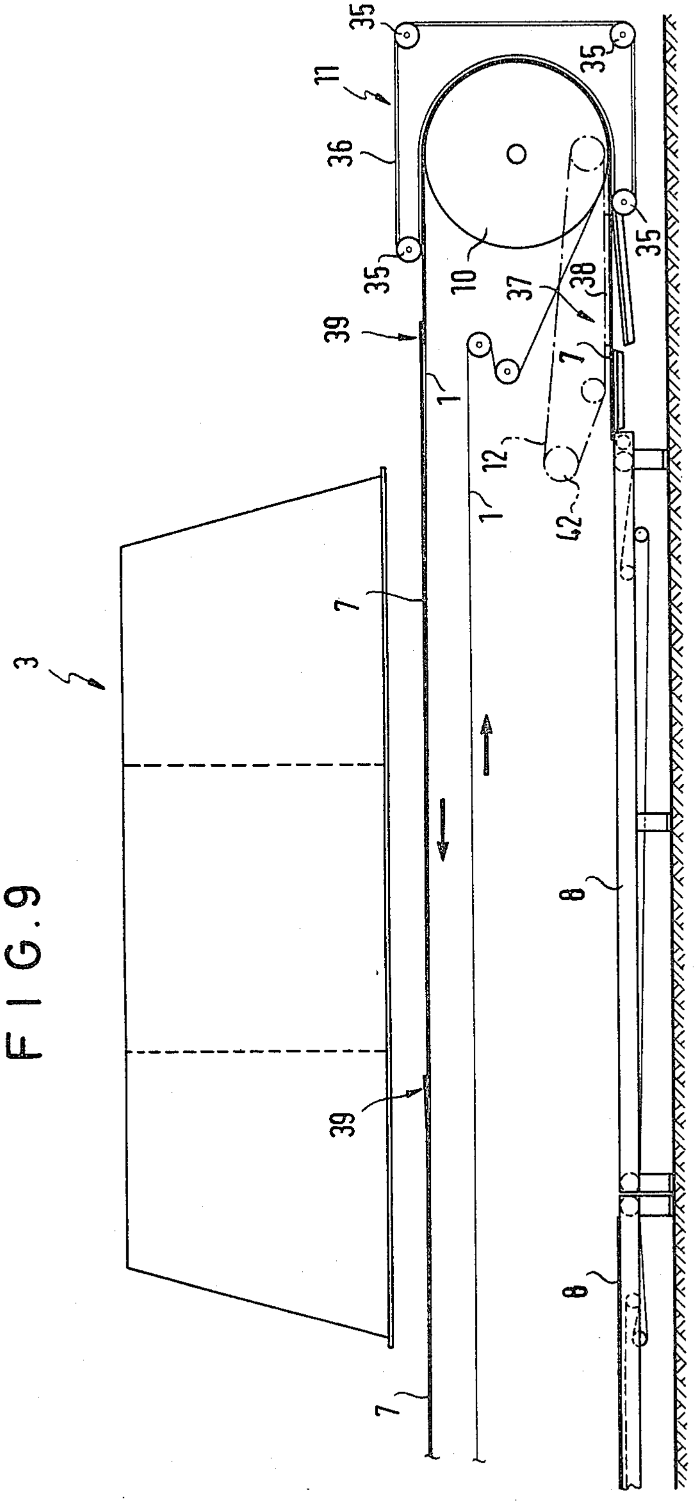

The invention will now be described by way of example only with reference to the accompanying drawings in which are shown:

FIG. 1 a schematic illustration of a forming line for use in the manufacture of particle boards showing in particular a scattering station for scattering a mat of particulate material onto mat carriers and the use of conveyors to forward the loaded mat sections to a stacker-loader arranged in front of a multistorey press and also to return the empty mat carriers from the stacker-loader, FIG. 2 a schematic detailed illustration to illustrate the procedure of loading the stacker-loader and removing unloaded mat carriers, FIG. 3 a sectional illustration taken on the line A-B of FIG. 2, FIG. 4 an illustration corresponding to FIG. 2 after the stacker-loader has been loaded, FIG. 5 a schematic illustration of a multistorey press with a stacker-loader and an unloading station, FIGS. 6*a* to 6*f* various phases of the loading of the press from the stacker loader, FIG. 7 a sectional view taken on the line A—A of FIG. 6*a*, FIG. 8 a plan view of a mat carrier, and FIG. 9 a schematic illustration of a mat carrier advancing station arranged upstream of the scattering station.

As seen in FIG. 1 the forming line includes a forming conveyor 1 whose return run is guided via corresponding deflection rollers to a direction reversing drum 10 of comparatively large diameter. The drum 10 and a counter pressure device 11 form a forwarding station 2 for feeding unloaded returned mat carriers 7 back onto the forming conveyor 1.

The forming conveyor 1 is guided in the customary manner beneath a scattering station 3 which is purely schematically illustrated, but is well known per se in the art, in particular in the form of a so-called wind sifting station. The mat carriers 7 are located on the top run of the forming conveyor with a predetermined degree of mutual overlap which is controlled, as will be later explained, by means of the forwarding station 2 which feeds the mat carriers onto the forming conveyor. It should be remarked however that overlapping of the mat carriers is not absolutely necessary.

Behind the scattering station 3, in the direction of movement of the forming conveyor 1, there is located a customary mat cut-off saw 6 which cuts a strip out of the endless scattered mat at each point of overlap of the mat carriers. The wood chips contained in the strip are sucked away in the customary manner and are once more returned to the scattering station. During the cut the cut-off saw travels at the speed of the forming conveyor in the direction of a stacker-loader 13 or press which is arranged downstream of the cut-off saw.

The mat is thus divided into individual mat sections loaded onto individual mat carriers. The loaded mat carriers are transferred from the forming conveyor 1 to a transport conveyor section 4 which includes an inbuilt weighing machine and which serves to accelerate the mat sections from the speed of the forming conveyor to the loading speed of the stacker-loader. This transport conveyor section is so constructed that badly packed mat sections, which are recognized by their deviation from a permitted weight tolerance, can be automatically discharged on their associated mat carriers without taking part in the further process. This is achieved as indicated in chain dotted lines beneath the section 4 in FIG. 1 by pivoting the transport conveyor section downwardly so that the faulty mat section and its associated mat carrier are loaded onto a return conveyor 8.

The transport conveyor section 4 is however normally followed by a storage band 5 for loading the stacker-loader 13 and, if necessary, for temporarily storing one or more mat sections whilst the stacker-loader is moved vertically to it various loading positions.

The apparatus for transferring the loaded mat carriers from the storage conveyor into the corresponding tiers of the stacker-loader 13 and for returning empty mat carriers from the stacker-loader will be explained in more detail with reference to FIGS. 2 to 4. The start of the return conveyor 8, by means of which the empty mat carriers can be returned to the forwarding station 2, is located directly beneath the end of the storage conveyor 5. The forwarding station 2 consists of a timing chain 12 which can be coupled with recesses provided in the edge borders of the mat carriers and which makes it possible to feed the mat carriers onto the forming conveyor with a defined relationship relative to the rear edge of the respective preceding mat carrier. As the forming conveyor 1 passes around the drum 10 it cooperates with a counter pressure device 11 which features an endless belt arrangement, which surrounds at least a half periphery of the drum 10 in its path around a number of associated rollers, and thereby assists to turn the mat carriers around the drum onto the upper run of the forming conveyor. The turning of the mat carriers which takes place at the forwarding station is advantageous because it ensures that both sides of the mat carrier are used and results in an increase in the life of these mat carriers.

The schematic illustration of FIG. 2 shows the time at which a mat carrier 7 loaded with a mat section 14 is transferred from the storage conveyor 5 into a tier 15 of the stacker-loader 13. Each tier of the stacker-loader has a horizontally displaceable pallet 16 onto which the loaded mat carrier is pushed or drawn. For this purpose transport arms 17 which are movable in the loading plane of the stacker-loader are provided at both sides alongside the stacker-loader. As can be seen from FIG. 3 the transport arms 17 are constructed in form of automatically operating catches which are able to engage with a mat carrier with their gripper ends located in longitudinal grooves 18 of the pallet. If a mat carrier is pushed onto the pallet by the storage conveyor then the transport arms 17 engage in recesses provided in the edge borders of the mat carrier and then draw the mat carrier 7, by means of a recirculating chain 40 (FIG. 5), together with the mat section 14 on the mat carrier into the end position on the pallet 16 which is shown in FIG. 4.

The removal of an empty i.e. unloaded mat carrier which is located in the same tier of the stacker-loader but beneath the pallet takes place simultaneously with the loading procedure. The pallet 16 and the unloaded mat carrier 7 do not mutually impede each other during this operation because the empty mat carrier lies between side runners 28 of the pallet (which can be seen in FIG. 7 but which are however not shown in the schematic illustration of the earlier figures). The removal of the unloaded mat carrier 7 and its transfer to the return conveyor 8 takes place by means of a second transport device defined by a clip arrangement 19 which moves to and fro in the extraction plane. This clip arrangement 19 is coupled with a recess provided in the rear end region of the mat carrier 7 and is once more decoupled after the unloaded mat carrier has been picked up by the return conveyor 8.

FIG. 4 shows the situation in which a mat carrier 7 with a mat section 14 arranged thereon has been loaded onto the pallet 16 and a further, unloaded, empty mat carrier 7 has been removed from the presently loaded tier 15 of the stacker-loader onto the return conveyor 8.

All the tiers of the stacker-loader can be loaded in corresponding manner. When all the tiers are filled, and accordingly no empty mat carriers are located in the stacker-loader, all the pallets are simultaneously fed into the following press by means of feed-in arms as will be later described. During this feed-in procedure the pallets are used to eject the ready pressed boards from the press. The pallets are then withdrawn from the press back into the stacker-loader and during this procedure the mat sections are deposited on their mat carriers in the various storeys of the press, the number of which is the same as the number of tiers in the stacker-loader, and the mat carriers from which the pressed boards have been ejected are drawn back by the pallets into the stacker-loader.

After this procedure the loading of the stacker-loader with mat sections can once more begin in conjunction with the return of the unloaded mat carriers.

The unloaded mat carriers which are returned to the forwarding station 2 via the return conveyor arrangement 8 beneath the forming conveyor 1 pass during their return movement through a clearance station 9. At the clearance station faulty mat sections returned from the transport conveyor 4 are cleared from the mat carrier and broken down into particulate material which is returned to the scattering station 3 for re-use. The clearance station 9 can also include cleaning devices for cleaning the empty mat carriers. At the forwarding station 2 the mat carriers are then picked up in the previously described manner by the timing chain 12 and are once more turned around onto the forming conveyor with predeterminable overlap as may be required.

Each freshly scattered mat section is weighed when it is completely located on the transport or acceleration band 4. If the mat section lies within the range of permissable weight tolerances then the band 4 accelerates and transfers the mat carrier and the mat section to the storage conveyor which runs at the same speed. The acceleration conveyor 4 then slows down once more to the forming conveyor speed. The retardation is finished before the next mat carrier is fed onto the transport or acceleration conveyor 4. At the same time as the transport conveyor is accelerated to the storage conveyor speed an unloaded mat carrier is removed from the stacker-loader 13 and is returned in the direction of the forwarding station 2.

If, on weighing, the weight of the mat section does not fall within the permissible tolerance range the transport conveyor 4 sinks to the position shown in chain dotted lines in FIG. 1 and the return conveyor 8 located beneath the storage band 5 changes its direction of rotation. After the transport conveyor has sunk it accelerates to the speed of the return conveyor and when the mat carrier with the imperfect mat section has left the transport conveyor it once more returns to the speed of the forming conveyor and pivots back into its horizontal position. The return conveyor 8 then once more changes its direction of rotation and guides the imperfect mat section towards the clearance station 9.

It can be seen from the previous operational description that the functional cooperation of the individual components of the forming line results in a compact, reliable, fast and automatically functioning installation which can be used for loading different stacker-loader and press system but which is however particularly suitable for loading stacker-loaders in which each tier is equipped with a horizontally movable pallet.

In this case a considerable saving of time is also achieved during raising and lowering of the stacker-loader and lowering and unloading of the press by the stacker-loader.

The loading of the press and the return of the mat carriers as envisaged by the invention will now be described in detail with reference to FIGS. 5 to 7.

FIG. 5 shows a multistorey press 20 with four storeys illustrated in the open condition. A stacker-loader 13 which has four corresponding tiers or storeys is arranged in front of the press and an unloading station 21 is positioned after the press. The individual storeys 22 of the press serve to receive mat sections from which single or multilayer press-boards are to be formed by the application of heat and pressure. The mat sections can be of relatively large area and are thus located on mat carriers 7 from which they are once more separated after the pressing procedure.

The stacker-loader 13 is vertically movable by means of a lifting and lowering device 41 for the purpose of loading and unloading with mat sections. The individual tiers 5 of the stacker-loader 13 carry respective pallets 16 which are horizontally movable and which serve to receive mat carriers loaded with mat sections, and also for the return of the unloaded empty mat carriers. The horizontal movement of the pallets 16 takes place by means of the feed arm 23 which is able to move all pallets simultaneously. The feed arm is adapted to be moved by a normal travelling belt system but can also be actuated in other ways which will be appreciated by persons skilled in the art.

The mat sections located on the mat carriers are transported by means of the storage conveyor 5 into the stacker loader. The removal of the unloaded mat carriers takes place by means of the return conveyor 8.

FIGS. 6a to 6f show the various phases of the loading of a press storey 22 with a mat section 15 from the associated tier 15 of the stacker-loader. The reference numeral 22A denotes an upper platten of the multiple press which cooperates with the lower platten 22B of the press storey 22.

The mat section 14 is brought into the position illustrated in FIG. 6a on the pallet 16 by a transport device which is not shown in this drawing but which lies in the plane of the storage conveyor and which engages in form locked relationship in recesses in the mat carriers and which then draws these into the desired position. During this transfer of the mat section 14 on its associated mat carrier 7 onto the pallet 16 an empty mat carrier disposed beneath the pallet 16 is removed by another transport device.

When all pallets of the stacker-loader are loaded with respective mat sections then the transfer of the mat sections into the open press 20 can begin. This procedure will now be explained by way of FIGS. 6b to 6f in respect of one storey. The stacker-loader 13 is first of all brought into a vertical position in which the lower edges of the pallets 16 lie significantly above the rear end of the mat carrier 7 which projects out of the press. This is illustrated in FIG. 6b.

All the pallets 16 are subsequently and simultaneously moved by the feed-in arm into the press over the edges of the mat carriers which project from the press. During this procedure abutments located beneath the stacker-loader are rotated and the stacker-loader is then lowered onto these abutments (not shown but well understood per se). The front edges of the pallets 16, which are constructed in the form of ejection noses, now lie in planes corresponding to the planes of the finished pressed boards 24 in the press 20. This is illustrated in FIG. 6c.

It should be noted that the mat carriers 7 associated with the finished boards 24 in the press 20 were previously located by holding devices 25, 26 provided at the input and exit sides of the press storey. The coupling between the holding device 26 at the exit side of the press and the mat carrier 7 is now released and the pallets, which were not further advanced during the sinking movement, are moved into the press and thereby push the finished boards in the press into the unloading station for finished boards which is located behind the press. This station is also conveniently provided with a number of tiers and can be constructed similarly to the stacker-loader. The ejection of the mat carrier lying beneath the finished board is prevented because the holding device 25 at the input to the press remains coupled with the mat carrier 7 during the ejection procedure. As can be recognized from FIG. 6d the pallet is moved, during the ejection procedure, somewhat beyond the end position of the mat section in the press and this results in two withdrawal devices 27 located beneath the pallet 16, and constructed as automatically operating drop catches, engaging in corresponding recesses in the unloaded mat carrier thus coupling the latter to the pallet (FIG. 6d).

The holding devices 25 at the inlet to the press are now released from the empty mat carriers and the pallets or trays 16 are moved back sufficiently far that the holding devices 26 at the outlets from the press can be coupled with the new mat carrier 7 which still carries a mat section 11. This coupling is possible because the mat carrier beneath the pallet 16 has been drawn out of the path of the holding member at the outlet side of the press by the return movement of the pallet (FIG. 6e).

The pallets 16 are now moved back into the stacker-loader so that the mat carrier 7 which is secured by the holding device 26 of the press slides off the pallet onto the press plate. When all the pallets have returned to their initial position the stacker-loader is lifted, the abutments beneath the stacker loader pivot out of the way and the stacker-loader is lowered to the plane of the storage conveyor where a fresh mat section awaits loading into the stacker-loader. Holding devices can now swing into place.

FIG. 6f shows the apparatus when the pallet 16 has been fully returned into the stacker-loader. There it can be seen that, on the one hand, the new mat section is exactly positioned in the press together with its mat carrier and that, on the other hand, the unloaded mat carrier has been withdrawn by the pallet into the corresponding tier of the stacker-loader from which it is then removed during the renewed loading of the pallet.

FIG. 7 shows a section corresponding to the line A—A in FIG. 6a. From FIG. 7 it can be seen that the pallet 16 which is intended to receive the mat carrier 7 and mat section 14 has side disposed runners or slides 28 by means of which the pallet can be displaced on the tier 15 of the stacker-loader. Side guides 29 ensure the required directed movement of the pallet and indeed by means of a relatively simple construction.

Two catches 27 can be recognized at the lower side of the pallet 16 which are constructed as automatically operating drop catches pivotable about pivot axes 30 and which are intended to engage in corresponding recesses of an unloaded mat carrier, or tray, when the mat carrier is to be drawn back from the press into the stacker-loader.

FIG. 8 shows a plan view of a mat carrier which consists of a thin plane member which can either be of flexible sheet metal, a textile ply, a woven, open mesh, sieve-like structure or other foil material. This mat carrier has recesses 31 arranged at its side borders symmetrically about its transverse central plane and further recesses 32 disposed at its end borders.

The symmetrical position of these recesses makes it possible to use the mat carrier 7 on both sides i.e. both sides of the mat carrier are suitable for receiving a mat section and it is thus always ensured that the required engagement with transport or holding devices can be ensured.

The recesses provided in the side edge border regions are intended for transport arms which form a first transport device for feeding the mat carrier 7 from a storage conveyor onto a pallet in the stacker-loader.

The centrally disposed recesses 33 at the end borders of the mat carrier are intended for engagement with the holding devices 25 and 26 provided at the press inlet and exit respectively and for engagement of the widrawal clips 19.

The recesses 32 disposed at the sides of the end borders are intended to cooperate with the withdrawal catches 27 provided at the pallet.

The exact construction and manner of operation of the forwarding station which ensures the overlapping of the mat carriers will now be more precisely described with reference to FIG. 9.

As seen in FIG. 9 the forming conveyor 1 is guided around a drum 10 so that the upper run passes through the scattering station 3 which is merely schematically illustrated. The lower run of the forming conveyor is guided to the drum at an acute angle to the horizontal via deflection rollers 34 which preferably also have a tensioning function.

Beneath the forming conveyor 1 there is located a return conveyor 8 for mat carriers which preferably comes from a stacker-loader for a press. The drum 10 is partially surrounded by a counter pressure device 11 which consists of belts 36 running around rollers 35. The belts 36 surround one side half of the drum and form horizontal guides for the mat carriers at the infeed and exit regions to, and from, the drum.

The mat carriers which are continuously supplied via the return conveyor 8 are passed to the infeed gap of the drum 10, which gap is formed between the forming conveyor 1 and the lower horizontal guide of the counter pressure device 11, by means of a timing transport device 37. The timing transport device 37 preferably consists of timing chains with followers 42 which engage in recesses in border regions of the mat carriers.

A mat carrier 7 supplied by the return conveyor 8 is accordingly picked up by the timing chain 12 of the forwarding station and is introduced into the infeed gap in a defined manner relative to the immediately proceeding mat carrier whereupon it is picked up by the driven forming conveyor 1, is held between the forming conveyor and the counter pressure belts, is turned around the drum with the forming conveyor and is then deposited in an exactly predeterminable manner on the upper run of the forming conveyor which passes through the scattering station 3.

The mat carriers can be deposited with overlap on the forming conveyor 1 by means of the timing chains 12 in a special manner so that the rear part of the preceding mat carrier lies on the front part of the subsequent mat carrier.

A change of length of the mat section to be pressed is achievable by changing the width of the overlap 39 between successive mat carriers. The width of the overlap can be changed by change of the operative length of the timing chain in simple manner. It is for example possible to make the coupling region 38 i.e. the region over which the followers of the timing chains engage the mat carriers 7, to be adjustable and if required this can be achieved by the use of an adjustable guidance of the followers. It is however also possible to achieve the defined introduction of the mat carriers into the infeed gap by means of transport devices of controllable speed. It will be appreciated that the width of the overlapping region can be simply controlled by varying the speed of the timing chains 12 with respect to the speed of the forming conveyor 1. Thus the speed at which the mat carriers are withdrawn from the infeed gap will be the speed of the forming conveyor 1 whilst the speed at which they are transferred into the gap is controlled by the speed of the timing chains 12.

Having regard to the desired simple construction the use of a timing chain of variable effective length is however regarded as particularly advantageous. This can be achieved as shown in FIG. 9 by means of an angled ramp located beneath the timing chain and the mat carriers. By adjusting the angle of this ramp the length of time for which the timing chain is in engagement with the mat carriers can be controlled because the ramp pushes the follower members out of engagement with the mat carriers. This is the equivalent of varying the length of the timing chain.

It will be appreciated by those skilled in the art that many modifications can be made to arrangements described above without departing from the scope of the present teaching. It will also be particularly appreciated that the system is not necessarily restricted to the manufacture of particle boards but could also be used with advantage in other systems in which artefacts require to be forwarded on carriers or trays into an operating machine and the trays need to be returned via conveyor devices to a loading station to pick up further artefacts. In particular it will be appreciated that the precise arrangement and number of the individual conveyors can be varied in dependence on the specific requirements.

We claim:

1. Apparatus for the manufacture of particleboard sections from cellulose based particulate material, the apparatus comprising a forming conveyor having upper and lower runs and arranged, in operation, to run continuously around first and second deflection drums with said upper run moving from said first deflection drum to said second deflection drum, a mat carrier forwarding station located at said first deflection drum and cooperating with said lower run to feed individual mat carriers with predetermined overlap onto said forming conveyor, a scattering station for scattering said particulate material in the form of a continuous mat onto the mat carriers, separating means for dividing the mat onto individual mat sections located on individual mat carriers, a transport conveyor section following said forming conveyor for picking up loaded mat carriers from the forming conveyor and for accelerating each mat carrier thereby to separate it from the next following mat carrier, a storage conveyor following said transport conveyor section, a multi-storey press for pressing said mat sections on said mat carriers, a vertically movable stacker loader having a number of tiers arranged between said storage conveyor and said multi-storey press, transport means for transferring loaded mat carriers from said storage conveyor into the tiers of said stacker loader, said stacker loader being adapted to transfer loaded mat carriers located in its tiers into one side of said multi-storey press and to withdraw mat carriers from the same side of said multi-storey press, and return conveyor means located beneath said storage conveyor and driven in the opposite direction thereto for returning unloaded mat carriers from said stacker loader to said mat carrier forwarding station.

2. Apparatus for the manufacture of particleboard sections from cellulose based particulate material, the apparatus comprising a forming conveyor having upper and lower runs and arranged, in operation, to run continuously around first and second deflection drums with said upper run moving from said first deflection drum to said second deflection drum, a mat carrier forwarding station located at said first deflection drum and cooperating with said lower run to feed individual mat carriers with predetermined overlap onto said forming conveyor, a scattering station for scattering said particulate material in the form of a continuous mat onto the mat carriers, separating means for dividing the mat into individual mat sections located on individual mat carriers, a transport conveyor section following said forming conveyor for picking up loaded mat carriers from the forming conveyor and for accelerating each mat carrier thereby to separate it from the next following mat carrier, a storage conveyor following said transport conveyor section, a multi-storey press for pressing said mat sections on said mat carriers, a vertically movable stacker loader having a number of tiers arranged between said storage conveyor and said multi-storey press, transport means for transferring loaded mat carriers from said storage conveyor into the tiers of said stacker loader, said stacker loader being adapted to transfer loaded mat carriers located in its tiers into one side of said multi-storey press and to withdraw mat carriers from the same side of said multi-storey press, and return conveyor means located beneath said storage conveyor and driven in the opposite direction thereto for returning unloaded mat carriers from said stacker loader to said mat carrier forwarding station and wherein, in respect of each tier of the stacker-loader, there is provided an associated pallet movable into and out of said multi-storey press, said pallet having upper and lower sides and being arranged to transport, on its upper side, a mat carrier loaded with a mat section into said multi-storey press and having means at its lower side for withdrawing another mat carrier from the press on movement out of the press.

3. The apparatus of either of claims 1 or 2 and wherein said mat forwarding station includes means for selectively varying the relative overlap of successive mat carriers on said forming conveyor.

4. The apparatus of either of claims 1 or 2 and wherein said transport means includes transport arms adapted to engage with cut-outs in the edge regions of the mat carriers with said transport arms being movable parallel to the tiers of said stacker-loader.

5. The apparatus of claim 4 and wherein each said transport arm is constructed in the form of an automatically engaging catch which engages in said cut-outs.

6. The apparatus of either of claims 1 or 2 and wherein second transport means are provided for removing unloaded mat carriers which are temporarily stored in the stacker-loader, said second transport means comprising an advancable and retractable clip arrangement disposed below the level at which mat carriers are loaded into the stacker-loader, said clip arrangement being engagable with recesses provided in an end edge region of the mat carriers whereby to feed said mat carriers onto said return conveyor means.

7. The apparatus of claim 6 and wherein said first and second transport means operate substantially simultaneously and moreover, at any one time, in respect of the same tier of the stacker-loader.

8. The apparatus of either of claims 1 or 2 and further comprising a clearance station and means for passing a faulty mat section from said transport conveyor section to said return conveyor means and from said return conveyor means to said clearance station.

9. The apparatus of either of claims 1 or 2 and wherein said mat carrier forwarding station comprises a counter pressure device facing said forming conveyor as it passes around said first drum with said counter pressure device and said forming conveyor cooperating to deflect unloaded mat carriers arriving on said return conveyor means around said first drum onto said upper run.

10. The apparatus of claim 9 wherein an infeed gap is provided between the lower run of said forming conveyor and said counter pressure device and wherein said return conveyor means leads said mat carriers into said infeed gap, the apparatus further comprising a transport timing device adjacent said infeed gap and engageable with the individual mat carriers to determine the overlap between sequential mat carriers.

11. The apparatus of claim 10 and wherein said counter pressure device comprises endless belt means guided over rollers and adapted to face said forming conveyor as it passes around said first drum thereby defining, together with said upper and lower runs, horizontal guides for said mat carriers.

12. The apparatus of claim 11 and wherein said first drum has a diameter substantially equal to one quarter of the length of a mat carrier.

13. The apparatus of claim 10 and wherein said transport timing device comprises at least one movable timing chain with follower members associated for movement therewith, said mat carriers having corresponding cut-outs in edge regions thereof and said follower members being engageable in the last said cut-outs.

14. The apparatus of claim 13 and wherein the positions of said follower members relative to said timing chain are changeable for the purpose of selecting a specified overlap between successive mat carriers.

15. The apparatus of claim 14 and wherein means are provided for driving the timing chain at constant speed and for adjusting the length of a region over which said follower members are engaged in said cut-outs.

16. The apparatus of claim 2 and wherein holding devices are provided at the input and output of each storey of the press with said holding devices being coupleable with the mat carrier and controlled in dependence on the instantaneous positions of the pallets.

17. The apparatus of claim 2 and wherein said pallets simultaneously form ejection members for ejecting pressed boards from said multi-storey press on movement of said pallets into said press.

18. The apparatus of claim 2 and wherein each tier of the stacker-loader has a floor for supporting, on the one hand, the associated pallet, and, on the other hand, mat carriers which have been withdrawn from the press.

19. The apparatus of claim 16 and wherein said holding devices arranged at the input and output of each storey consist of bolts which are pivotable and/or displaceably journalled on lower heating plates of the press and wherein said mat carriers have cut-outs adapted to receive said holding devices.

20. The apparatus of claim 2 and further comprising a common arm for effecting simultaneous movement of the pallets into and out of said multi-storey press.

21. The apparatus of claim 2 and wherein the length of said pallets is greater than the length of said mat carriers.

22. The apparatus of claim 17 and wherein each pallet has a forward end which is constructed as an ejection nose, wherein the pallets are provided at their sides with runners and wherein the tiers of said stacker-loader have side walls for guiding said runners.

23. The apparatus of either of claims 1 or 2 and wherein the number of tiers of the stacker-loader is the same as the number of storeys of the associated multi-storey press.

24. The apparatus of either of claims 1 or 2 and wherein said forming conveyor runs at a first constant speed, said storage conveyor runs at a second constant speed higher than said first constant speed and said transport conveyor section comprises conveyor means which can be accelerated from the speed of said forming conveyor to the speed of said storage conveyor and can be decelerated again from the speed of said storage conveyor to the speed of said forming conveyor.

25. The apparatus of either of claim 1 or 2 and wherein said mat carriers consist of an open-mesh sieve material.

26. The apparatus of either of claims 1 or 2 and wherein the mat carriers consist of sheet metal.

27. A stacker-loader for use in loading and unloading a multi-storey press in the manufacture of particleboard from individual mat sections of cellulose-based particulate material carried on individual mat carriers, said stacker-loader comprising a plurality of tiers, a plurality of pallets each associated with a respective one of said tiers and means for moving said pallets simultaneously into and out of respective storeys of said press and wherein each said pallet has an upper side and a lower side, said upper side being adapted to support a mat carrier loaded with a mat section during movement thereof into the press and means at the lower side of said pallet for withdrawing a further, empty mat carrier from the press during movement of the pallet out of the press.

28. A mat carrier forwarding station for use in the manufacture of particleboard for loading mat carriers onto a forming conveyor having upper and lower runs, said forming conveyor rotating in operation, continuously around first and second drums, said mat forwarding station comprising a counter pressure device in the form of endless belt means guided over rollers and adapted to face said forming conveyor as it passes around said first drum, said endless belt means cooperating with the lower run of said forming conveyor to define an infeed gap, there being further provided a transport timing device adjacent said infeed gap and engageable with said mat carriers to overlap each said mat carrier by a predetermined amount on the preceding mat carrier.

29. The apparatus of claim 28 wherein said transport timing device comprises at least one movable timing chain with follower members associated for movement therewith, said mat carriers having corresponding cut-outs in end regions thereof and said follower members being engageable in said cut-outs.

30. The apparatus of claim 29 and wherein means are provided for driving said timing chain at constant speed and for adjusting the length of a region over which said follower members are engaged in said cut-outs.

* * * * *